United States Patent [19]
Hoecker

[11] Patent Number: 5,601,630
[45] Date of Patent: Feb. 11, 1997

[54] PROCESS FOR THE PRODUCTION OF SYNTHETIC RUTILE

[75] Inventor: Walter Hoecker, Subiaco, Australia

[73] Assignee: The Commonweath Industrial Gases Limited, Chatswood, Australia

[21] Appl. No.: 199,470

[22] Filed: Feb. 22, 1994

[30] Foreign Application Priority Data

Feb. 23, 1993 [AU] Australia .................. PL7460

[51] Int. Cl.[6] .................. C21B 11/06; C22B 34/12
[52] U.S. Cl. .................. 75/435; 423/86
[58] Field of Search .................. 75/435; 423/86

[56] References Cited

U.S. PATENT DOCUMENTS

| | | |
|---|---|---|
| 2,399,845 | 5/1946 | Allen et al. . |
| 3,127,649 | 6/1964 | de Benedictis et al. . |
| 3,655,038 | 4/1972 | Mercade . |
| 3,681,047 | 8/1972 | Lynd et al. . |
| 3,811,569 | 5/1974 | Shireley et al. . |
| 4,014,474 | 3/1977 | Anitila et al. . |
| 4,069,295 | 1/1978 | Sugahara et al. .................. 75/753 |
| 4,097,574 | 6/1978 | Auger et al. . |
| 5,110,455 | 5/1992 | Huch . |
| 5,186,920 | 2/1993 | Heng et al. . |

FOREIGN PATENT DOCUMENTS

| | | |
|---|---|---|
| 1470333 | 5/1934 | Australia . |
| 1470233 | 5/1934 | Australia . |
| 0308836 | 3/1937 | Australia . |
| 247110 | 9/1993 | Australia . |
| 0410496 | 1/1991 | European Pat. Off. . |
| 1941509 | 9/1970 | Germany . |
| 58-199720 | 11/1993 | Japan . |
| 9004656 | 5/1990 | WIPO . |
| 9113180 | 9/1991 | WIPO . |

OTHER PUBLICATIONS

Farrow et al., "The Reaction between Reduced Ilmenite and Oxygen in Ammonium Chloride Solution", Hydrometallurgy, vol. 18, 1987, Amsterdam NL, pp. 21–38.

Bracanin, BF et al., "Direct Development of a Direct Reduction and Leach process for Limenite Upgrading", Trans. Metall. Soc. AIME Paper Selection No. A72–31, 1972, 209–259.

Bracanin, BF et al., "Direct Reduction Technology—the Western Titanium Process for the Production of Synthetic Rutile, Ferutil, and Spong Iron", Aust. Inst. Min. Metall. Conference, WA, Aug. 1979, 55–68.

Primary Examiner—Melvyn Andrews
Attorney, Agent, or Firm—R. Hain Swope; David A. Draegert

[57] ABSTRACT

A process for removal of iron from reduced titanium ores involves hydrometallurgical treatment with an aqueous solution through which an oxidising gas including oxygen and/or ozone is passed to oxidise metallised iron present within said reduced titanium ore.

6 Claims, 3 Drawing Sheets

PROCESS FOR THE PRODUCTION OF SYNTHETIC RUTILE

FIELD OF THE INVENTION

This invention relates to the production of synthetic rutile by hydrometallurgical processes and, in particular, to the production of synthetic rutile by the Becher process.

BACKGROUND TO THE INVENTION

Titanium dioxide is, in its pure form, a valuable white pigment used in paints. Traditionally, the pigment has been obtained using the "Chloride" or "Sulphate" processing routes. The "Sulphate" processing route, which has fallen into disfavour in recent times due to the environmental problems caused by the disposal of acidic ferrous sulphate liquors, involves the pug-roasting of ilmenite with concentrated sulphuric acid to form a solid sulphate cake which is then dissolved in hot dilute sulphuric acid to liberate iron. Ferric ion is removed from the solution by reduction with scrap iron and ferrous ions are partially removed from the solution by crystallisation of hydrated ferrous sulphate (copperas). Hydrous titanium dioxide is calcined and further processed to produce the pigment.

In order to overcome the environmental problems inherent in the "Sulphate" route, the "Chloride" route has become commonplace. The "Chloride" process involves the chlorination of natural or synthetic rutile at high temperatures to form a mixture of titanium tetrachloride and ferric chloride vapours which are separated from each other by selective condensation and, if necessary, further refining steps. The titanium tetrachloride is then oxidised to produce pigment grade titanium dioxide or reduced to produce titanium metal in accordance with the Kroll process.

It is clear that in both of the above processing routes the removal of iron is a problem, which at the very least involves further capital costs to address. For example, ferric chloride may be oxidised in a costly further processing stage to iron oxides and the chlorine recovered for further use in a chloride process.

Moreover, as the world reserves of natural rutile, containing approximately 95% by weight titanium dioxide fall, the iron removal problem becomes more acute. Therefore, alternative processes have been devised for the environmentally acceptable production of synthetic rutile from the abundant available reserves of ilmenite, a mixed iron and titanium oxide ore, represented approximately by the formula $FeTiO_3$. Ilmenite contains about 53% by weight titanium dioxide.

The majority of such processes include hydrometallurgical steps but generally commence with partial or complete reduction of the iron oxides present within the ilmenite to metallic iron by pyrometallurgical processing followed by selective leaching of the iron with hydrochloric or sulphuric acids, ferric chloride or aerated water. The process where aerated water is used is called the Becher Process, and is essentially an accelerated iron "rusting" process wherein, commonly, a salt such as ammonium chloride is also added as a corrosion promoter.

The process commences with a carbothermic reduction step in a rotary kiln at 1150° C. to which coal or a suitable carbonaceous agent is added, both as a reductant and as a fuel. The reduced ilmenite from the kiln is then cooled and further treated with an aerated aqueous solution, ideally containing 1% by weight ammonium chloride, in a stirred batch reactor in order to rust out the iron over a period of 12 to 16 hours.

The ammonium chloride is believed to give benefits in terms of an accelerated iron corrosion rate for two major reasons. Firstly, the chloride ions can break down passive oxide filme which may have formed on the metallic iron during the reduction stage while, secondly, the ammonium ion acts as a buffer against very high pH values near the surface of the reacting iron. This assists in the removal of hydroxyl ions by the reaction:

$$NH_4^+{}_{(aq)} + OH^- \rightarrow NH_3 + H_2O \qquad (I)$$

If the hydroxyl ions were not removed by this reaction they would react with ferrous ions produced by the half reaction:

$$Fe \rightarrow Fe^{2+} + 2e^- \qquad (II)$$

to produce a precipitate of hydrated ferrous oxide in the pores of the ilmenite, thus slowing and possibly completely stopping the rusting reaction by reducing or eliminating the supply of oxygen to the metallic iron within the ilmenite grains. This is a limitation of the conventional process. Upon completion of the reaction, the iron oxides produced are removed from the reaction mixture by washing in hydrocyclones. The synthetic rutile is then subjected to a final hydrochloric acid leaching step to remove residual iron and produce a product grading 92 weight % titanium dioxide which is suitable as a feedstock to pigment or metal production processes.

A clear disadvantage of the above process, however, is that it is rate-limited by the diffusion rate of oxygen to the metallic iron which comes about due to the low solubility of oxygen in aqueous solutions.

SUMMARY OF THE INVENTION

With this object in view the present invention provides a process for the production of a synthetic rutile comprising the step of reducing a titanium ore containing iron oxides with a reducing agent to provide a reduced titanium ore containing metallic iron, the reduced titanium are being contacted in a contacting step with an aqueous solution through which a gas containing oxygen and/or ozone is passed during the contacting step to oxidise the metallic iron. Most preferably ozone or ozonated oxygen, i.e ozone in admixture with oxygen, is to be employed.

Preferably, the aqueous solution contains between 0.1 and 5% ammonium chloride, most preferably 1% ammonium chloride. Conveniently the gaseous mixture contains up to 1%, preferably 0.001 to 1%, more preferably 0.005 to 0.015% and most preferably 0.01% volume basis ozone, through lower concentrations in oxygen may also be effective. The ozone may be produced on site at the synthetic rutile plant by any method of production known to those skilled in the art.

Conveniently, the pulp density of reduced ilmenite in the aqueous solution ranges between 10 and 60% solids by weight, preferably 40 to 60% solids by weight and the temperature at which the oxidation takes place ranges between 20° and 70° celsius, most preferably 50° celsius. The gas containing ozone may also contain other gases such as oxygen or other oxidising gases.

The oxidising gas is introduced to the aqueous solution by any means suitable for introduction of gases to liquids and may be a simple sparging means or a more sophisticated type designed to form micron-sized swarms of gas bubbles thus enhancing gas solubility.

DETAILED DESCRIPTION OF THE INVENTION

The invention will be more clearly understood from the following description of a preferred embodiment thereof made with reference to the accompanying figures in which.

Figure 1:
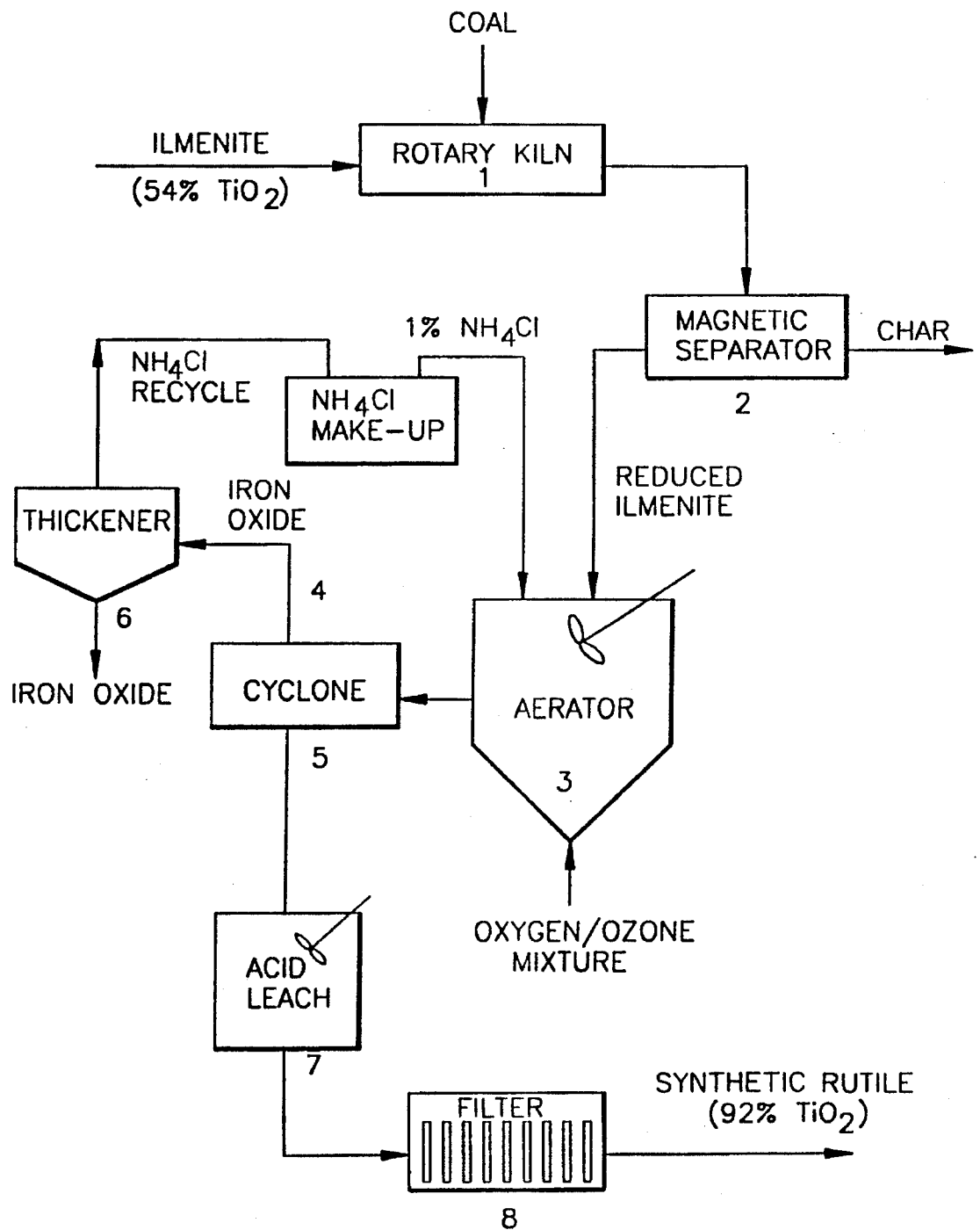
FIG. 1 is a process flowsheet showing one possible route to the production of synthetic rutile and incorporating ozone injection according to the process of the present invention.

Referring now to FIG. 1, ilmenite grading 54 weight % titanium dioxide is fed to a rotary kiln 1 heated to 1150° C. and held there together with pulverised coal for sufficient time to reduce iron oxides to metallic iron. The product metallised or reduced ilmenite-coal ash mixture is then separated into reduced ilmenite and ash by a magnetic separation step in magnetic separator 2. The reduced ilmenite is then fed to a batch stirred oxidation reactor 3 held at 50° C. and a pulp density of 30 weight % reduced ilmenite and contacted with an aqueous ammonium chloride solution containing 1% by weight ammonium chloride. Ozone, possibly in admixture with air or, ideally, oxygen to increase the oxygen partial pressure, is sparged through the solution causing oxidation of the iron. Fine particles of insoluble iron oxides and ammonium chloride solution are removed as overhead 4 from the cyclone and the treated ilmenite is removed as underflow 5. The overhead 4 is clarified in a thickener from which ammonium chloride solution is recovered as overflow and recycled to the oxidation reactor 3. The iron oxide is removed from the thickener as underflow 6 and disposed of or sold, possibly as a feedstock to an iron or steelmaking process.

Ozone is produced on-site using an ozonator or similar equipment understood by those skilled in the art of ozone production. The exact nature of the ozone production method is not critical to the success of the invention but, by way of example, may be mentioned the method in which an electrical discharge is passed through air or oxygen, the latter being more preferred for present purposes. The methods of production are not free of hazards and so the normal precautions should be taken.

In the final step of the process the treated ilmonito is leached with hydrochloric acid to remove residual iron and manganese and filtered to separate the synthetic rutile grading 92% by weight or higher titanium dioxide. The synthetic rutile product is suitable for use in a titanium dioxide pigment production plant.

Figure 2:
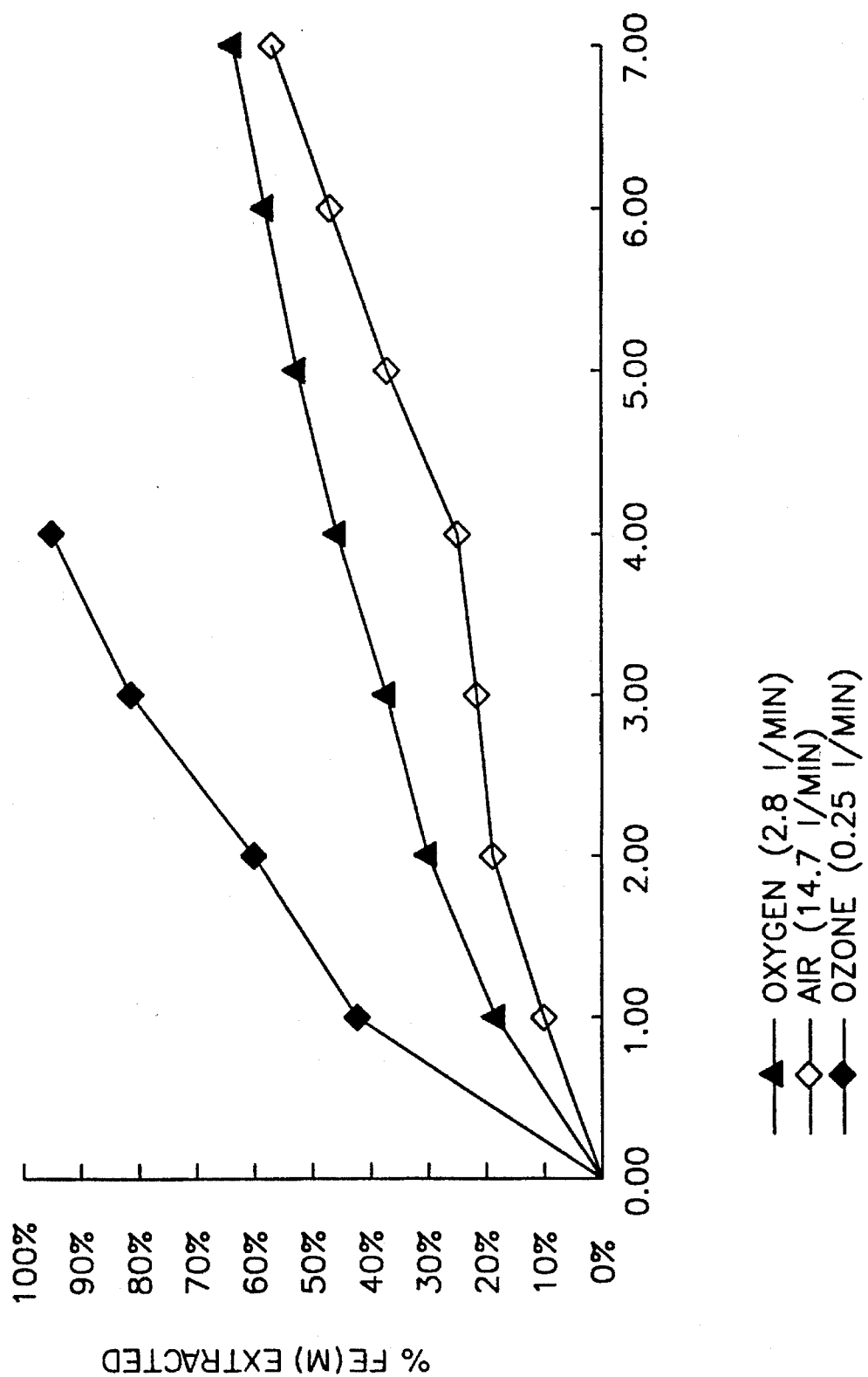
FIG. 2 is a graph showing the effect of air, oxygen and ozone addition on iron removal kinetics from reduced ilmenite at 50° C.
Figure 3:
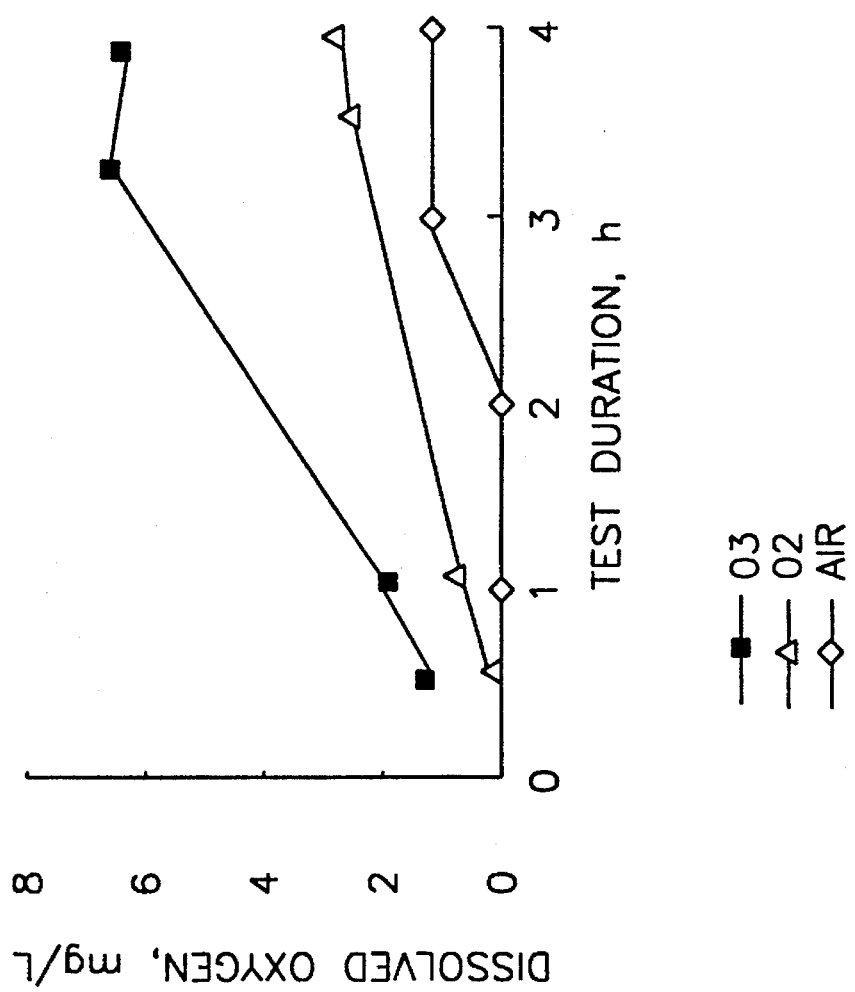
FIG. 3 is a graph showing the dissolved oxygen levels as a function of time during iron rusting from reduced ilmenite for air, oxygen and ozonated oxygen.

The above description is generally illustrative of the process of the present invention and performance results of such a process as performed on the laboratory scale are reproduced herebelow as Table 1 and FIG. 2.

The conditions under which the tests were performed are as follows. A cylindrical vessel, having 18 liters capacity, was filled with 17.41 kg of water to which 8.77 kg of reduced ilmenite produced in accordance with the process as described above was added under agitation. It is to be appreciated, in this regard, that reduced ilmenite is a fine grained heavy mineral and the absence of a high degree of agitation may prove quite detrimental to the efficiency of the process. 176 grams of analytical grade ammonium chloride, sufficient to form a 1% aqueous solution, was then added to promote the iron liberation process.

A turbine agitator of the Rushton type is suitable for the purpose of attaining the required levels of agitation and an impeller speed of 100 rpm was selected for the purposes of the tests. After two hours agitation, the impeller speed was reduced to 600 rpm.

Various gases and gas mixtures were then tested in accordance with the process of the invention. The gases and gas mixtures analysed as follows:

A. Air at 14.7 liters per minute (3.09 liters per minute equivalent oxygen)

B. Oxygen at 2.8 liters per minute.

C. Oxygen/Ozone containing 0.01 volume percent ozone in 2.8 liters per minute flow of oxygen and were introduced by a sparger located 100 mm directly below the agitator. The sparger is ideally selected to enhance gas solubility and suitable sparging means are widely available to those skilled in the art.

Iron liberation results in accordance with the process and as a function of time are reproduced in Table 1 below:

TABLE 1

| Iron Liberation (% by wt Fe) as a function of Time | | | |
|---|---|---|---|
| | Test | | |
| Time (hours) | A | B | C |
| 0 | 0 | 0 | 0 |
| 1 | 9 | 18 | 42 |
| 2 | 18 | 30 | 60 |
| 3 | 22 | 37 | 82 |
| 4 | 27 | 48 | 96 |
| 5 | 38 | 53 | — |
| 6 | 48 | 58 | — |
| 7 | 58 | 64 | — |

FIG. 2 shows a possible mechanism for the improved performance of a process involving ozone. Without in any way wishing to limit the generality of the invention it appears that the solubility of oxidant is important. It is apparent that the solubility of ozonated oxygen in the aqueous ammonium chloride solution at 50° C. as monitored by an Orion dissolved oxygen meter, approaches a limit of 8 $mg.L^{-1}$ whereas the solubility of oxygen alone only reaches a limit of 4 $mg.L^{-1}$ over the same duration of 4 hours. The solubility of air is substantially lower than this. Thus oxidant utilisation with ozonated oxygen is therefore essentially more efficient. Since the rusting reaction is diffusion controlled, higher temperatures would be expected to yield greater benefits in terms of reaction rate provided that such benefits were not offset by the reduction in ozonated oxygen or ozone solubility.

I claim:

1. A process for the production of synthetic rutile comprising reacting a titanium ore containing iron oxide with a reducing agent to produce a reduced titanium ore containing metallic iron, contacting the reduced titanium ore with an aqueous solution containing an oxidizing gas selected from the group consisting of oxygen, ozone and a mixture thereof to thereby oxidize at least a portion of the metallic iron and produce said synthetic rutile.

2. The process of claim 1 wherein the oxidizing gas is ozone.

3. The process of claim 1 wherein the oxidizing gas contains up to 1% by volume of ozone.

4. The process of claim 1 wherein the oxidizing gas is a mixture of ozone and oxygen.

5. The process of claim 1 further comprising sparging the oxidizing gas through the aqueous solution.

6. The process of claim 5 comprising agitating the aqueous solution.

* * * * *